United States Patent Office 3,490,503
Patented Jan. 20, 1970

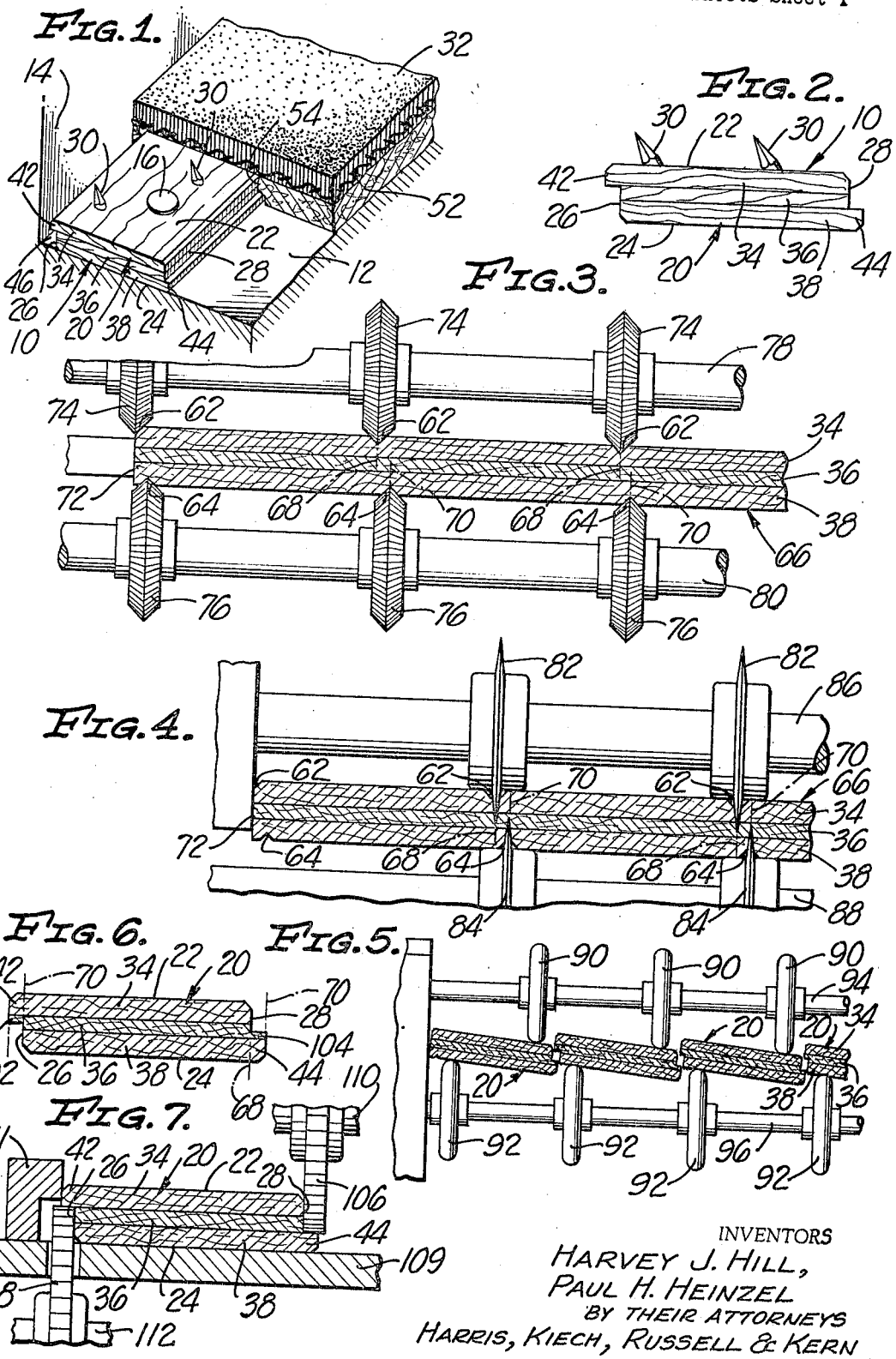

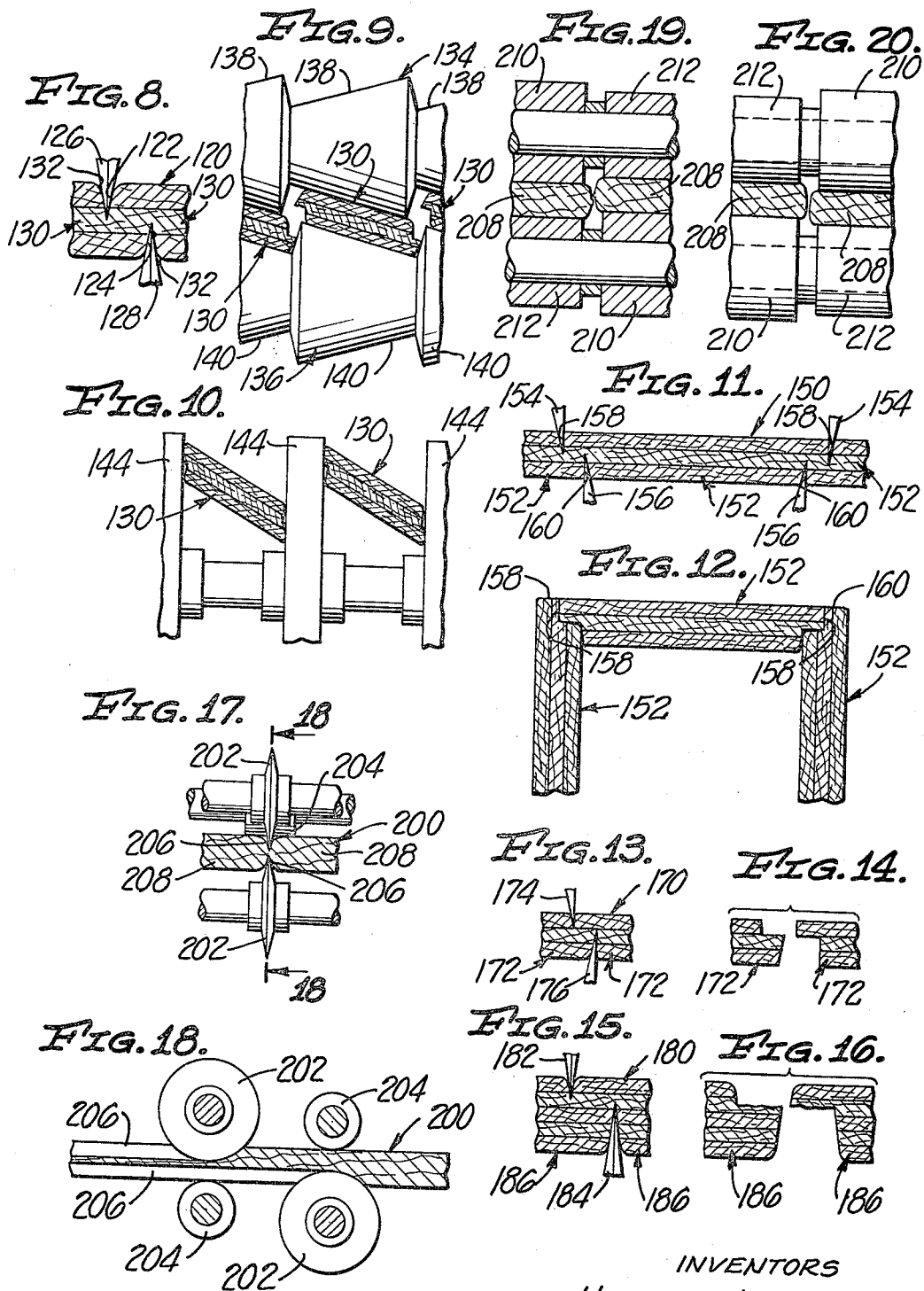

3,490,503
METHOD AND APPARATUS FOR CUTTING FLAT SHEETS INTO STRIPS
Harvey J. Hill, Monterey Park, and Paul H. Heinzel, Glendora, Calif., assignors to Roberts Consolidated Industries, Inc., City of Industry, Calif., a corporation of California
Filed Oct. 16, 1967, Ser. No. 675,495
Int. Cl. B27d 1/10
U.S. Cl. 144—323                4 Claims

ABSTRACT OF THE DISCLOSURE

A method of and apparatus for forming a flat sheet, such as a sheet of plywood, into strips. The invention involves making matching parallel cuts in opposite sides of the sheet to depths the sum of which is at least nearly equal to the thickness of the sheet, and then breaking the sheet into strips in zones repectively interconnecting the cuts in opposite sides of the sheet. The cuts in one side of the sheet may be directly opposite the cuts in the other, with the result that the strips are substantially rectangular in cross section. Alternatively, the cuts in one side of the sheet may be offset laterally from the cuts in the other so that the result is asymmetrical strips having diagonally-opposite, laterally-projecting flanges extending longitudinally of their edges, such strips being particularly suitable for carpet gripper strips. After breaking, the edges of the strips are trimmed to remove any rough portions.

Background of invention

The invention relates in general to a method of and an apparatus for cutting flat pieces of various materials, hereinafter referred to as flat sheets, into strips, preferably of uniform widths. The invention is particularly applicable to cutting flat sheets of wood, and especially plywood, into strips, although it is also applicable to other materials.

The invention finds particular utility in the fabrication of wooden strips, and especially plywood strips, for use in the manufacture of carpet grippers. Consequently, the invention will be considered primarily herein in connection with the manufacture of carpet grippers, with the understanding that it is not limited thereto and may be used to form wooden or other strips for various other purposes, some of which will be specifically disclosed hereinafter.

Considering the present invention in connection with the manufacture of carpet grippers for background purposes, it contemplates a carpet gripper of the type comprising a wooden gripper strip, and especially a plywood gripper strip, having carpet hooking elements or prongs which project upwardly above the upper side or surface of the strip and which are included outwardly toward an outer edge of the strip to secure an edge of carpeting overlying the strip against inward movement relative to a room in which the carpeting is installed.

A carpet gripper strip of the foregoing nature is ordinarily used with its outer edge adjacent, but spaced from, a wall in installing wall to wall carpeting. The raw edge of the carpeting is turned downwardly and tucked into the space between the wall and the outer edge of the strip to conceal it. Frequently, the outer edge of the strip is beveled downwardly and inwardly of the strip to provide additional space (for a given spacing of the strip from the wall) into which excess carpeting can be tucked, thereby reducing the precision with which the carpeting must be trimmed. (The spacing of the strip from the wall is preferably slightly less than the thickness of the carpeting so that the carpeting is compressed when the excess is tucked into the space between the strip and the wall. Such compression is necessary to resist unhooking of the carpeting under the influence of shifting furniture, vacuum-cleaner suction, shuffling feet, and the like.)

Normally, the carpeting is installed over padding with the edge of the padding more-or-less abutting the inner edge of the strip. This abutting relation is ordinarily attained as the result of trimming the padding by running a knife along the inner edge of the strip as a guide, the point of the knife being in engagement with the floor adjacent the inner edge of the strip. With this procedure, an accurate fit between the gripper strip and the padding is achieved.

The invention contemplates a gripper strip of the foregoing general type wherein the configuration of the strip in cross section is such that more space is available between the outer edge of the strip and an adjacent wall (for a given spacing of the strip from the wall) to receive the corresponding edge of the carpeting, as compared to a strip having a beveled outer edge. This additional space reduces the accuracy with which the carpeting needs to be trimmed, which is an important feature.

The invention further contemplates a gripper strip having a cross sectional configuration such that the inner edge of the strip may be used as a knife guide in cutting padding without engagement of the point of the knife with the floor. This construction eliminates scoring of the floor in the case of a wooden floor, or other floor surface capable of being scored, and minimizes the excessive dulling and wearing away of the point of the knife which is encountered when the floor is of concrete, or other hard material. When the inner edge of a conventional gripper strip is used as a knife guide for cutting padding on a concrete floor, the point of the knife must be sharpened frequently. The present invention minimizes the necessity for sharpening the knife, which is an important feature.

The foregoing may be achieved with an asymmetrical cross sectional configuration providing an outer, upper flange extending longitudinally of the gripper strip and projecting laterally outwardly from the outer edge thereof and having an upper surface forming an outward extension of the upper side of the strip, and providing a diagonally opposite, inner, lower flange extending longitudinally of the strip and projecting laterally inwardly from the inner edge thereof and having a lower surface forming an inward extension of the lower side of the strip.

The upper flange mentioned has space therebeneath into which the edge of the carpeting may be tucked, thereby providing more carpet-receiving space between the outer edge of the strip and the wall than is available with the beveled outer edge hereinbefore discussed.

The gripper strip is preferably made of wood, or a similarly relatively soft and nonabrasive material, and the lower flange mentioned provides a knife-supporting surface which prevents scoring of the floor and/or excessive wear of the point of the knife when the knife is run along the inner edge of the strip in cutting the padding to fit.

Thus, the simple expedient of forming the carpet gripper strip asymmetrically with the diagonally opposite upper and lower flanges mentioned attains the objectives mentioned with a very simple structure, which is an important feature.

The invention still further contemplates making the carpet gripper strip of three-ply plywood and to utilize portions of the upper and lower plies as the upper and lower flanges, respectively, the upper flange having a thickness approximately equal to the thickness of the upper ply and the lower flange having a thickness approximately equal to the thickness of the lower ply.

Cross reference to related application

A carpet gripper strip having the foregoing cross-sectional configuration is disclosed and claimed in co-pending patent application Ser. No. 483,125, filed Aug. 27, 1965 by one of us, viz, Harvey J. Hill, now Patent No. 3,353,-204, granted Nov. 21, 1967, and assigned to the same assignee as the present application.

Summary and objects of invention

A primary object of the invention is to provide a method of making carpet gripper or other strips from flat sheets which reduces to an absolute minimum wastage of the material from which the sheets are made.

Another primary object is to provide a method of making from a flat sheet a number of carpet gripper or other strips the sum of the over-all widths of which exceeds the width of the original sheet.

More specifically, an important object of the invention is to provide a method of making uniform-width carpet gripper or other strips from a flat sheet which includes the steps of: cutting into the sheet from one side thereof along parallel first lines spaced apart in a direction parallel to the sides of the sheet; cutting into the sheet from the opposite side thereof along second lines respectively parallel to the first lines, and spaced apart in the direction mentioned, to a depth at least nearly equal to the difference between the thickness of the sheet and the depth of cut along the first lines; and then breaking the sheet into strips in zones respectively interconnecting the cuts made along the first lines and the second lines.

An object in connection with one embodiment of the invention is to locate each of the first cutting lines and the corresponding one of the second cutting lines in a plane perpendicular to the sides of the sheet, i.e., directly opposite each other, so that the resulting strips are substantially rectangular in cross section.

Still another and important object is to space the second cutting lines from the respective first cutting lines in a direction parallel to the sides of the sheet. With this procedure, the resulting strips are provided with flanges which extend longitudinally of the strips, which project laterally from the edges thereof, and which have surfaces forming continuations of one or both sides of the strips.

Another and important object is to laterally offset all of the second cutting lines from the first cutting lines in the same direction. The result is that each strip has an asymmetrical cross sectional configuration wherein one laterally projecting flange forms a continuation of one side of the strip and the other laterally projecting flange is located diagonally opposite the first and forms a continuation of the other side of the strip. This asymmetrical cross section provides the preferred carpet gripper strip configuration hereinbefore outlined.

Cutting into opposite sides of the sheet along first and second cutting lines which are laterally offset results in the production of overlapping strips from each sheet, so that the sum of the over-all widths of the strips made from the sheet actually exceeds the total width of the original sheet, which is an important feature. For example, considering the asymmetrical carpet gripper strip discussed, forty-four strips approximately 1.040 inches in width can be made from a sheet of plywood forty-eight inches wide according to prior practice. Utilizing the present invention, the same sheet will produce fifty strips of the same over-all width, which is a substantial saving in material.

Another object of the invention is to trim the edges of strips made in accordance with the invention to remove rough portions thereof, or to provide the edges with modified configurations. An object in this connection is to remove rough portions from the edges of strips of substantially rectangular cross section produced in accordance with the invention by rubbing the edges of the strips together in directions perpendicular to the sides of the original sheet, thereby wearing away from the edges of the strips any rough portions produced by the breaking step. An object in this connection applicable to another embodiment of the invention is to make the strips from plywood with the interstrip breaking zones located within an interior ply, and to subsequently remove at least portions of the interior ply adhering to the resulting laterally projecting flanges to smooth same.

Still another object of the invention is to perform the cutting operations with thin shearing blades which remove no material from the sheet so as to eliminate wastage. A related object is to form shallow, V-shaped grooves in the sides of the sheet ahead of the shearing blades to relieve side pressure and friction on the shearing blades. These grooves also serve to bevel the corners of the strips slightly, which is an important feature in carpet gripper strips because such beveled corners minimize wear of carpeting thereabove. An object in this respect in connection with another embodiment is to eliminate the preliminary grooving step and to utilize shearing blades of sufficient thickness to round the adjacent corners of the resulting strips, such rounded corners having the same advantage in carpet gripper strips as the beveled corners mentioned.

The foregoing objects, advantages, features and results of the present invention, together with various other objects, features, advantages and results thereof which will be evident to those skilled in the art to which the invention relates, may be achieved with the exemplary embodiments of the invention illustrated in the accompanying drawings and described in detail hereinafter.

Description of drawings

FIG. 1 is a fragmentary perspective view, partially in section, of a carpeting installation incorporating a carpet gripper which includes a gripper strip made in accordance with the method of the invention;

FIG. 2 is an enlarged end view of a carpet gripper including a gripper strip made in accordance with the method of the invention;

FIGS. 3, 4, 5 and 7 are views partially in elevation and partially in section illustrating successive steps in the method of the invention;

FIG. 6 is a transverse sectional view through an unfinished gripper strip showing its condition subsequent to the step of FIG. 5 and prior to the final step of FIG. 7;

FIG. 8 is a fragmentary view, partially in elevation and partially in section, which is similar to a portion of FIG. 4, but which illustrates an alternative cutting step of the method of the invention;

FIGS. 9 and 10 are views partially in elevation and partially in section respectively similar to FIGS. 5 and 7, but respectively illustrating alternative breaking and trimming steps of the invention;

FIG. 11 is a view, partially in section and partially in elevation, of another alternative cutting step of the invention;

FIG. 12 is a sectional view illustrating a structure which can be made from strips produced by the cutting step of FIG. 11;

FIGS. 13 and 15 are views, partially in section and partially in elevation, of still other alternative cutting steps of the invention;

FIGS. 14 and 16 are fragmentary sectional views showing the edges of strips made by the cutting steps of FIGS. 13 and 15, respectively;

FIG. 17 is a view, partially in elevation and partially in section, illustrating still another alternative cutting step of the invention;

FIG. 18 is a sectional view taken as indicated by the arrowed line 18—18 of FIGS. 17; and FIGS. 19 and 20 are views, partially in section and partially in elevation, illustrating successive steps in trimming the edges of strips formed by the cutting steps of FIGS. 17 and 18.

Description of exemplary embodiments of invention

As background, FIG. 1 shows a carpet gripper 10, made in accordance with the method of the invention as will be described hereinafter, secured to a floor 12 adjacent, but spaced from, a wall 14, as is conventional in many wall-to-wall carpeting installations. Preferably, the carpet gripper 10 is nailed to the floor 12, one nail being shown at 16 in FIG. 1, but it also may be secured in other ways, as by adhering it to the floor.

The carpet gripper 10 comprises a long, narrow, gripper strip 20 made in accordance with the method of the invention and having upper and lower surfaces or sides 22 and 24 and outer and inner edges 26 and 28. The adjectives "outer" and "inner" are used herein with reference to the floor 12 being carpeted, the outer edge 26 of the gripper strip 20 being the edge thereof nearest the corresponding outer edge of the floor.

The carpet gripper 10 includes a plurality of carpet hooking elements 30 carried by the gripper strip 20 and projecting upwardly above the upper side 22 of the strip and inclined outwardly toward the outer edge 26 thereof to secure carpeting 32, FIG. 1, overlying the upper side of the gripper strip. Preferably, as is conventional, the gripper strip 20 is made of wood and the carpet hooking elements 30 are nails driven through the strip from the lower side 24 thereof. To prevent splitting, the gripper strip 20 is preferably made of plywood. In the construction illustrated, three-ply plywood is used. More particularly, the gripper strip 20 comprises an upper ply 34, an intermediate ply 36 and a lower ply 38.

The upper ply 34 projects beyond the outer edge 26 of the gripper strip 20 and the lower ply 38 projects inwardly beyond the inner edge 28 of the gripper strip, this cross-sectional configuration being achieved with the method of the invention, as will be described hereinafter.

The effect is to provide the gripper strip 20 with an outer, upper flange 42 extending longitudinally of the strip and projecting laterally outwardly from the outer edge 26 thereof and having an upper surface forming an outward extension of the upper side 22 of the strip, and to provide the strip with an inner, lower flange 44 extending longitudinally of the strip and projecting laterally inwardly from the inner edge 28 thereof and having a lower surface forming an inward extension of the lower side 24 of the strip.

For a given spacing of the outer edge 26 of the upper ply 34 from the wall 14, the inward displacement of the outer edges of the intermediate and lower plies 36 and 38 resulting from the presence of the outwardly projecting upper flange 42 increases the volume of the space or gully 46 between the gripper strip 20 and the wall 14, as compared to conventional gripper strips wherein the outer edges of all plies are in the same vertical plane, or wherein the outer edge of the gripper strip is beveled so that the outer edges of the plies are in a plane sloping downwardly and inwardly. In the first instance, the additional gully volume is equal to the volume under the upper flange 42, and in the second instance, the additional volume is equal to one-half the volume under the upper flange.

The additional volume for the gully 46 which the present invention provides permits tucking a greater volume of the carpeting 32 into the gully after the carpeting has been stretched, hooked onto the carpet hooking elements 30, and trimmed, as shown in FIG. 1 of the drawings. Consequently, the operation of trimming the edge of the carpeting does not need to be carried out as accurately, which is an important feature of the enlarged gully 46 provided by the outwardly projecting upper flange 42 of the invention since it saves time in installing the carpeting 32.

Turning now to the inwardly projecting lower flange 44, it may be used as a support for a knife, not shown, employed to trim padding 52 by running the knife along the inner edge 28 of the gripper strip 20 with the point of the knife sliding along the upper surface of the lower flange 44. The knife may be positioned substantially vertically in trimming the padding 52, or it may be inclined at an angle. With the former procedure, the inner edge 28 of the gripper strip 20 is engaged by the side of the knife to guide the knife. With the latter procedure, the point of the knife is guided by the corner between the inner edge 28 of the gripper strip 20 and the upper surface of the lower flange 44.

In either case, any excess padding is trimmed off to provide a padding edge 54 which drops down into more-or-less abutting relation with the inner edge 28 of the gripper strip 20, as shown in FIG. 1 of the drawings. The padding edge 54 does not abut the inner edge 28 of the gripper strip 20 perfectly when the padding 52 is trimmed in this way, but precision fitting is not necessary since the padding 52 is soft and resilient and will readily conform to the slight irregularity provided by the lower flange 44.

The inwardly projecting lower flange 44 has an extremely important function in that, by providing a wooden surface for the point of the padding-trimming knife to slide along, it eliminates the rapid dulling and wearing away of the knife point which is normally encountered by sliding the point of the knife along a concrete floor in the absence of the lower flange 44. Thus, resharpening of the knife is necessary only infrequently, as compared to conventional gripper strips without the lower flange 44 for protecting the point of the knife. Furthermore, in the case of a wooden floor, the presence of the lower flange 44 eliminates scoring of the floor.

Thus, the simple expedient of forming the gripper strip 20 with the upper and lower flanges 42 and 44 provides both additional gully space and protection for the padding-trimming knife and the floor 12 with a very simple structure, which is an important feature. It should be noted that the presence of the lower flange 44 permits increasing the gully space without any reduction in the strip width in contact with the floor, which is important to provide adequate resistance to the forces applied in stretching the carpeting, particularly when the strip is secured by an adhesive.

Turning now to a consideration of one embodiment of the method of the invention, the various steps to be described may be carried out as separate operations in separate machines, or they may be carried out in a single machine as successive operations. For convenience, the various steps will be considered herein as comprising separate operations.

Considering the first step of the method with reference to FIG. 3, grooves 62 and 64, which are preferably V-shaped, are formed in opposite sides of a plywood sheet 66 along lines 68 and 70 which parallel an edge 72 of the sheet. Preferably, the sheet is provided with three plies respectively corresponding to the hereinbefore-discussed upper, center and lower plies 34, 36 and 38 of the completed gripper strip 20. The grooves 62 and 64 may be formed by saws 74 and 76, or by rollers, having V-shaped edges and mounted on shafts 78 and 80 driven in any suitable manner.

The opposed lines 68 and 70 of each pair, and the centers of the corresponding opposed grooves 62 and 64, are offset or staggered in the plane of the sheet 66 by an amount equal to the width of the upper and lower flanges 42 and 44 of the finished gripper strip 20. This distance may be of the order of 0.080 inch, for example. It will be noted that the over-all width of the finished gripper strip 20 is equal to the spacing of the saws 74, or the saws 76, plus the flange width.

Turning to FIG. 4 of the drawings, the next step is to pass the sheet between opposed rotary shearing blades 82 and 84 which respectively shear the sheet 66 along the centers of the grooves 62 and 64, i.e., along the lines 68 and 70. The shearing blades 82 and 84, which may be mounted on suitably-driven shafts 86 and 88, cut to depths at least substantially equal to one-half the thickness of the sheet 66, and preferably cut to depths substantially through the center ply 36. Thus, the cuts made by the shearing blades 82 and 84 of each opposed pair of such blades overlap in the direction of the thickness of the sheet 66.

By forming the shallow grooves 62 and 64 for the shearing blades 82 and 84 to follow, the side pressure and friction acting on the shearing blades are relieved. Also, the provision of the grooves 62 and 64 results in providing the finished gripper strip 20 with beveled outer corners, as shown in FIG. 2. The bevel of the outer corner which extends along the top of the inner edge 28 of the finished gripper strip 20 is particularly important since it eliminates a sharp corner which might cause wear of the overlying carpeting 32.

Referring to FIG. 5, the next step is to pass the grooved and sheared sheet 66 between opposed breaking rolls or wheels 90 and 92 mounted on suitably-driven shafts 94 and 96. The rolls or wheels 92 are spaced from the rolls or wheels 90 a distance less than the thickness of the sheet 66 so that the sheet is broken, approximately in the central plane thereof, into strips which will be finished into the gripper strips 20.

One of the strips which results from the breaking operation of FIG. 5 is shown in FIG. 6. The strip of FIG. 6 closely approximates the finished gripper strip 20, except that portions 102 and 104 of the intermediate ply 36 still adhere to the lower and upper surfaces of the upper and lower flanges 42 and 44, respectively, of the finished gripper strip.

The aforementioned adhering portions 102 and 104 of the center ply 36 are removed, as shown in FIG. 7, by circular saws 106 and 108 which respectively smooth the lower and upper surfaces of the upper and lower flanges 42 and 44, the nearly finished strip being supported by a table 109 and engaging a guide 111. The saws 106 and 108 are mounted on suitably-driven shafts 110 and 112.

The step of FIG. 7 completes the gripper strip 20, and, upon installation of the carpet hooking elements 30, the finished carpet gripper 10 results.

It will be noted that the method of the invention, in addition to producing the desired cross-sectional configuration for the gripper strip 20, does so with almost no wastage of the plywood sheet 66. The lost material comprises only: the material removed from the upper and lower plies 34 and 38 by the V-edged saws 74 and 76; the portions of the center ply 36 lying between the opposed lines 68 and 70 of each pair of such lines; a small portion of the lower ply 38 adjacent the edge 72 of the sheet 66, and a similar small portion, not shown, of the upper ply 34 adjacent the opposite edge, not shown, of the sheet 66.

Furthermore, since the gripper strips 20, in effect, overlap in the plane of the sheet 66 prior to their fabrication from such sheet, the sum of their over-all widths actually exceeds the original sheet width. Thus, for a given gripper-strip over-all width, more gripper strips can be obtained from a sheet of a given width than is possible with prior practice, which is an important feature.

Referring to FIG. 8 of the drawings, fragmentarily illustrated therein is a three-ply plywood sheet 120 in the opposite sides of which laterally offset or staggered cuts 122 and 124 are made by rotary shearing blades 126 and 128, respectively, without the pregrooving step of FIG. 3, it being understood that similar pairs of laterally offset cuts are made all the way across the plywood sheet to form a plurality of embryonic gripper strips 130 each similar to the gripper strip 20. Since the plywood sheet 120 is not pregrooved prior to forming the cuts 122 and 124, the cuts 122 and 124 are deeper for the same plywood-sheet thickness and for the same depth of penetration, the latter being substantially equal to one-half the thickness of the plywood sheet. Consequently, the surfaces or sides of the plywood sheet 120 are compressed somewhat adjacent the cuts 122 and 124, as indicated by the numeral 132 in FIG. 8, to provide the finished gripper strip 130, see FIG. 10, with rounded outer corners corresponding to the beveled outer corners of the gripper strip 20 of FIG. 2. Such rounded corners perform the same function as the beveled corners of the gripper strip 20 in eliminating sharp corners which might cause wear of overlying carpeting.

Referring to FIG. 9, the sheet 120, after being provided with the laterally spaced pairs of laterally offset cuts 122 and 124, is passed between opposed breaking rolls 134 and 136. These breaking rolls have complementary surfaces 138 and 140 inclined relative to the axes thereof and engageable with opposite sides of the sheet 120 respectively between the cuts 122 and the cuts 124. As will be apparent, passing the cut or sheared sheet 120 between the breaking rolls 134 and 136 results in breaking thereof into the gripper strips 130 in fracture zones respectively interconnecting the paired cuts 122 and 124, the fracture zones lying within the center ply of the sheet with the particular procedure illustrated.

Turning to FIG. 10, the next step is to pass the nearly finished gripper strips 130 between trimming or milling blades 144 with the strips laterally inclined at angles of the order of 30° to the axis of the blades 144, any suitable holding and guiding means, not shown, for the gripper strips 130 being provided. This operation results in providing the edges of the gripper strips 130 with the desired final inclinations relative to the sides thereof, and also removes most of the exposed rough portions resulting from the breaking operation. It will be noted that the rounded corners provided by the shearing blades 126 and 128 are not affected by the trimming or milling blades 144.

Turning to FIG. 11 of the drawings, illustrated therein is a plywood sheet 150 being cut into strips 152 by paired rotary shearing blades 154 and 156 respectively penetrating opposite sides thereof. In this case, the rotary shearing blades 156 are also laterally offset with respect to the rotary shearing blades 154, but alternate blades 156 are laterally offset relative to the corresponding blades 154 in opposite directions. The result is that the strips 152, after separation from each other by breaking in zones respectively interconnecting the cuts made by the blades 154 and 156, are generally T-shaped in cross section. Such T-shaped strips 152 can be assembled, as by gluing, to form a structure having the configuration shown in FIG. 12. It will be further noted that the rotary shearing blades 154 and 156 of each pair have their facing sides perpendicular to their axes of rotation so as to form cuts respectively having surfaces 158 and 160 perpendicular to the sides of the strips 150. As will be apparent from FIG. 12, certain of the perpendicular surfaces 158 and 160 can be brought into flat abutting relation to provide the structure of FIG. 12 with virtually invisible external joints.

FIGS. 13 and 14 illustrate the cutting of a three-ply plywood sheet 170 into strips 172 by rotary shearing blades 174 and 176 respectively similar to the rotary shearing blades 154 and 160, except that the sides of the blades which are perpendicular to the sides of the strips 172 face in the same direction. Also, the blade 174 and 176 penetrate the sheet 170 to a point adjacent the interface between an exterior ply and the center ply, instead of penetrating to a point substantially midway of the interior or center ply. Thus, it will be apparent that a wide variety of different cuts can be made in accordance with the method of the invention.

FIGS. 15 and 16 illustrate still another cutting pattern wherein two tapered rotary shearing blades 182 and 184, similar to the tapered rotary shearing blades 126 and 128, are used to form laterally offset cuts in a five-ply sheet 180 to divide such sheet into strips 186. The blades 182 and 184 penetrate into an interior ply adjacent one of the exterior plies, so that the fracture zone upon subsequent breaking is located within this interior ply. Numerous other ply numbers, rotary shearing blade configurations, and rotary shearing blade positions may be used in practicing the method of the invention.

Turning to FIGS. 17 and 18, illustrated therein is a wooden sheet 200, not necessarily plywood, passing between tapered rotary shearing blades 202 arranged in tandem with their central planes coinciding and perpendicular to the sides of the sheet 200. Tandem rolls 204 are located opposite the respective rotary shearing blades 202 to provide the reaction forces necessary to offset the shearing forces perpendicular to the plane of the sheet 200. With this procedure, the cuts 206 are directly opposite each other so that, when the sheet 200 is subsequently broken into strips 208, FIGS. 19 and 20, these strips are substantially rectangular in cross section, but are provided with rounded corners owing to the hereinbefore-described action of the tapered rotary shearing blades 202.

Turning to FIGS. 19 and 20, the sheared or scored sheet 200 may be broken into the strips 298 along fracture zones interconnecting the cuts 206 by paired rolls 210 and 212 of different diameters, the rolls 210 being larger than the rolls 212. As shown in FIG. 19, in one pair of rolls, the larger roll 210 engages the upper side of the corresponding strip 208 and the smaller roll 212 engages the lower side thereof. In the next pair of rolls, the smaller roll 212 engages the upper side of the next strip 208, and the larger roll 210 engages the lower side thereof. This produces relative vertical movement of the two adjacent strips 208 to break them apart. More particularly, for the particular relative positions shown in FIG. 19, the right-hand strip 208 is moved upwardly and the left-hand strip 208 is moved downwardly to break these strips apart.

As shown in FIG. 20, the two strips 208 next pass between more of the rolls 210 and 212 with the positions of the rolls reversed. In other words, the left-hand strip 208 passes between a lower larger diameter roll 210 and an upper smaller diameter roll 212, whereas the right-hand strip passes between an upper larger diameter roll 210 and a lower smaller diameter roll 212. This has the effect of moving the left-hand strip 208 upwardly and the right-hand strip 208 downwardly relative to the positions they occupied in FIG. 19. By passing the strips 208 through a series of such paired rolls 210 and 212, with alternate sets of rolls having the relationships respectively shown in FIGS. 19 and 20, it will be apparent that the adjacent strips 208 are caused to move upwardly and downwardly relative to each other repeatedly. This results in wearing away of any rough portions of the edges of the strips, as will be seen by a comparison of FIGS. 19 and 20. Thus, no separate trimming operation is necessary.

Adverting to FIGS. 17 and 18, the tandem arrangement of shearing blades 202 with their back-up rolls 204 has an important advantage in that it does not require the rotary shearing blades 202 to have shoulders in engagement with opposite sides of the sheet 200. (Compare FIGS. 17 and 18 to FIG. 4 in this respect.) Consequently, wear and sharpening of the rotary shearing blades 202 may be compensated for merely by adjusting the spacings between these blades and their opposed rollers 204. The same concept may be applied to the rotary shearing blades 82 and 84 of FIG. 4, for example, arranging these blades in tandem, as well as in laterally offset relation, and providing rolls, similar to the rolls 204, thereopposite.

Although exemplary embodiment of the invention have been disclosed herein for purposes of illustration, it will be understood that various changes, modifications and substitutions may be incorporated in such embodiments without departing from the spirit of the invention as defined by the claims presented in the following section of this specification.

We claim as our invention:

1. A method of forming a flat sheet having spaced, parallel sides into strips, including the steps of:
    (a) cutting into the sheet from one side thereof along parallel first lines spaced apart in a direction parallel to the plane of the sheet;
    (b) cutting into the sheet from the opposite side thereof along second lines respectively parallel to said first lines and spaced apart in said direction, to depths respectively at least nearly equal to the differences between the thickness of the sheet and the depths of cut along said first lines, each of said first lines and that one of said second lines nearest thereto being disposed in a plane perpendicular to the plane of the sheet;
    (c) breaking the sheet into strips in zones respectively interconnecting the cuts made along said first lines and said second lines; and
    (d) rubbing the edges of the strips together, after breaking the sheet into such strips, in directions perpendicular to the plane of the original sheet, thereby wearing away from the edges of the strips any fragments produced by the breaking step.

2. A method of forming a flat sheet having spaced, parallel sides into strips each provided with spaced, parallel sides and spaced, parallel edges and comprising two flanges which extend longitudinally thereof, which respectively project laterally from said edges thereof, and which respectively have surfaces forming continuations of said sides thereof, including the steps of:
    (a) grooving the sheet on one side thereof along parallel first lines spaced apart in a direction parallel to the plane of the sheet;
    (b) grooving the sheet on the opposite side thereof along second lines respectively parallel to said first lines and respectively spaced from said first lines in said direction;
    (c) cutting into the sheet from said one side thereof along said first lines;
    (d) cutting into the sheet from said opposite side thereof along said second lines to a depth at least nearly equal to the difference between the thickness of the sheet and the depth of cut along said first lines; and
    (e) breaking the sheet into strips in zones respectively interconnecting the cuts made along said first lines and said second lines.

3. A method of forming a flat plywood sheet, having more than two plies and having spaced, parallel sides, into strips each provided with spaced, parallel sides and spaced, parallel edges and comprising two flanges which extend longitudinally thereof, which respectively project laterally from said edges thereof, and which respectively have surfaces forming continuations of said sides thereof, including the steps of:
    (a) cutting into the sheet from one side thereof along parallel first lines spaced apart in a direction parallel to the plane of the sheet, into an interior ply of the sheet;
    (b) cutting into the sheet from the opposite side thereof along second lines respectively parallel to said first lines and respectively spaced from said first lines in said direction, into said interior ply and to a depth at least nearly equal to the difference between the thickness of the sheet and the depth of cut along said first lines;
    (c) breaking the sheet into strips in zones respectively interconnecting the cuts made along said first lines and said second lines; and
    (d) removing portions of said interior ply lying in said zones.

4. In an apparatus for forming a flat sheet having spaced, parallel sides into strips, the combination of:
 (a) means for cutting into the sheet from one side thereof along first lines spaced apart in a direction parallel to the plane of the sheet;
 (b) means for cutting into the sheet from the opposite side thereof along second lines respectively parallel to said first lines and spaced apart in said direction, to depths respectively at least nearly equal to the differences between the thickness of the sheet and the depths of cut along said first lines;
 (c) means engageable with the sides of the sheet between said first lines and between said second lines for breaking the sheet into strips in zones respectively interconnecting the cuts made along said first lines and said second lines; and
 (d) means for removing material from the edges of the strips formed by said breaking means.

References Cited

UNITED STATES PATENTS

| | | | |
|---|---|---|---|
| 2,053,375 | 9/1936 | Nicholas | 225—3 |
| 2,110,728 | 3/1938 | Hoggatt | 144—326 |
| 2,369,221 | 2/1945 | Dunseath | 225—3 |
| 2,609,049 | 9/1952 | Rayburn | 225—3 |

GERALD A. DOST, Primary Examiner

U.S. Cl. X.R.

225—2, 3, 96.5